United States Patent Office 3,833,715
Patented Sept. 3, 1974

3,833,715
PROCESS FOR MANUFACTURING SULFUR OR SULFUROUS ANHYDRIDE FROM AMMONIUM SULFATES
Andre Deschamps, Chatou, Claude Dezael, Maisons-Laffitte, and Philippe Renault, Noisy-le-Roi, France, assignors to Institut Francais du Petrole, des Carburants et Lubrifiants, Rueil-Malmaison, France
No Drawing. Filed July 17, 1972, Ser. No. 272,449
Claims priority, application France, July 20, 1971, 7126613; Oct. 20, 1971, 7137788
Int. Cl. C01d 17/02; C01c 1/10, 11/60
U.S. Cl. 423—573     9 Claims

ABSTRACT OF THE DISCLOSURE

Sulfur and/or sulfurous anhydride are manufactured by reacting hydrogen sulfide or ammonium sulfide with an ammonium salt of an oxygenated sulfur acid. The improvement consists of carrying out the reaction within molten sulfur, whereby corrosion is considerably reduced.

---

This invention concerns the manufacture of sulfur dioxide or sulfur from ammonium sulfate or other ammonium salts of oxygenated acids of sulfur and hydrogen sulfide.

The ammonium sulfate is available in large amounts and difficult to convert to valuable products and cannot be discharged as waste without risk of polluting the rivers. It would accordingly be advantageous to proceed to the recovery of its constituting elements, i.e. ammonia, sulfur and sulfuric acid. The reduction of this salt by means of hydrogen requires very high temperatures, which are incompatible with the stability of ammonia.

It has now been discovered that, by injecting ammonium sulfate into melted sulfur, at a temperature from, for example, 250° C. to 440° C., preferably from 300 to 350° C., the neutral or acid ammonium sulfate is reduced by the hydrogen sulfide and produces either sulfurous anhydride or sulfur. The production of sulfurous anhydride or sulfur depends on the molar ratio of the sulfate to $H_2S$.

The major reactions are the following:

$(NH_4)_2SO_4 \rightarrow NH_4HSO + NH_3$
$3(NH_4)_2SO_4 + H_2S \rightarrow 4SO_2 + 6NH_3 + 4H_2O$
$3NH_4HSO_4 + H_2S \rightarrow 4SO_2 + 3NH_3 + 4H_2O$
$(NH_4)_2SO_4 + 3H_2S \rightarrow 4S + 2NH_3 + 4H_2O$
$NH_4HSO_4 + 3H_2S \rightarrow 4S + NH_3 + 4H_2O$
$(NH_4)_2S_2O_3 + 2H_2S \rightarrow 4S + 2NH_3 + 3H_2O$
$(NH_4)_2S_4O_6 + 5H_2S \rightarrow 9S + 2NH_3 + 6H_2O$ It is thus apparent that, by using a molar ratio of the ammonium sulfate to the hydrogen sulfide close to 1/3, sulfur is selectively obtained. On the contrary, when this ratio is about 3/1, there is essentially obtained sulfur dioxide.

However, there can be used intermediate values of this ratio or even values outside the range between the above-mentioned limits.

It is also apparent that the optimum ratio depends on the sulfur compounds to be treated and that this ratio for the totality of the compounds, will be preferably from about 0.2 to 10 moles of $H_2S$ per mole of treated compound. It is also possible to proceed below the lower or beyond the higher limit and to recycle the unconverted compounds.

The hydrogen sulfide may be used as a mixture or in combination with ammonia.

The same reaction may be performed with ammonia salts or other sulfur oxygenated compounds, particularly in order to produce sulfur.

It is thus possible to convert all the sulfur compounds contained in the brines to elemental sulfur and to recover the ammonia initially engaged in these salts.

Thus, the aqueous solutions of ammonia salts of oxygenated sulfur compounds, for example, of sulfites, sulfates, thiosulfates, thionates and, more generally, of all the sulfur compounds corresponding to the various states of sulfur oxidation, may be injected into liquid sulfur, together with ammonium sulfide and/or hydrogen sulfide, in order to produce sulfur with the evolution of an ammonia containing gas.

The reactor containing the sulfur and in which the contact takes place may be maintained at a temperature from 160 to 440° C. and preferably from 175 ot 300° C.

It may be necessary to concentrate the brines before the treatment. A vaporizer heated up to a temperature of, for example, from 100 to 150° C., provides for the evaporation of a major part of the water. The concentration of the brines will be advantageously of about 1 to 10 moles/liter when they are injected into the liquid sulfur.

Simultaneously, ammonium sulfide and/or hydrogen sulfide is introduced into the liquid sulfur.

There is thus produced an ammonia containing gas and sulfur which is added to the reaction medium. In a continuous run, the sulfur must be withdrawn periodically so as to keep substantially constant the sulfur amount contained in the reactor.

The ammonium sulfide may, for example, be supplied from a refinery residual waste water.

The gas stream containing hydrogen sulfide may be specially produced by reacting sulfur with a hydrocarbon or may be supplied from refinery units for the washing with amines or from units for the gas treatment.

The aqueous solutions to be treated may contain one of the above-mentioned salts or a mixture of two or more of them in variable proportions. The reactions within the liquid sulfur may be stoichiometrical, in which case, the gas evolution will essentially consist of ammonia and steam and there will not be added to the reaction medium any compound other than sulfur, when the amount of ammonium sulfide and/or $H_2S$ which is contacted with the sulfur compounds in the solutions conforms with the relationship:

$$\sum \begin{pmatrix} \text{oxidation number of sulfur} \times \text{number of sulfur} \\ \text{atoms per mole of sulfur compound} \times \text{num-} \\ \text{ber of moles of sulfur compound} \end{pmatrix} = 0$$

The definition of the oxidation number of sulfur is given in "General Chemistry" of Linus Pauling, chap. 10, pages 168 to 187, W. H. Treetman and Co., San Francisco, Calif., edition 1947.

The oxidation number of sulfur is, for example, $-2$ in $H_2S$ and sulfides $+4$ in sulfites, $+2$ in thiosulfates and $+6$ in sulfates.

When the brines contain ammonium sulfate, the reduction reaction in the liquid sulfur will require a high temperature, at least 250° C. and, preferably, from 300 to 440° C.

In the case of a reduction with ammonium sulfide, the reaction is as follows:

$(NH_4)_2SO_4 + 3H_2S, 3NH_3 \rightarrow 4S\downarrow + 5NH_3 + 4H_2O$

Temperatures of similar values will be used for treating the brines containing ammonium thionates.

In the case where they contain, for example, only sulfites or ammonium thiosulfates, it is not necessary to conduct the operation at such high levels, and temperatures of about 160 to 300° C. will be sufficient.

The gas effluent evolving during the reactions essentially consists of $NH_3$ and $H_2O$. After condensation, it can be recovered for restoring the ammonia solutions used for absorbing the fumes containing $SO_2$ and/or $H_2S$. It may be advantageous to provide for a recycling by bubbling of said gaseous or condensed effluent through the reaction medium.

The pressure, in the reactor will be for example, from 0.2 to 5 atmospheres, but preferably, it would be chosen close to the atmospheric pressure.

The contact within the reaction medium consisting of liquid sulfur will be achieved as satisfactorily as possible. Any apparatus for gas-liquid contact, conveniently adapted for this particular use, will be employed. For example, the operation can be conducted in a reactor mechanically stirred, by circulation of liquid sulfur or by dispersion of gases, in packed columns or plate columns where the gaseous phases may circulate counter-currently, etc.

The process of the present invention offers an original solution to the problem of pollution of air and waters.

The purification of the gaseous effluents containing sulfur dioxide and sulfur trioxide, by washing with ammonia solutions, results, in fact, in the recovery of aqueous solutions containing, in highly variable proportions, ammonia salts such as for example, sulfites, sulfates, thiosulfates and thionates.

This is the case in the purification of a number of industrial fumes, particularly the combustion fumes produced by the steam generating plants fed with sulfur-containing fuels and of gaseous effluents produced by certain chemical plants or Claus ovens.

Various techniques for the treatment of these effluents have been already described. For example, it is known to heat the aqueous solution containing the ammonia salts, under pressure, at temperatures of from 180 to 200° C., so as to realize the decomposition of these salts to sulfur and ammonium sulfates. The disadvantage of this technique resides in the loss of the ammonia in the form of ammonium sulfate, a product which is not easily converted to valuable products and cannot be discharged as waste without risk of polluting the waters.

One of the advantages of the process is to avoid the corrosion which is observed when using other reaction media, for example molten ammonium sulfate.

The following examples are given for illustrating purpose and thus are by no way to be considered as limiting the scope of the invention.

EXAMPLE 1

100 g. of sulfur are brought to 350° C. in a reactor. The sulfur at this temperature, is very fluid. The reactor is fed through a pipe, for 1 hour, with hydrogen sulfide, at a flow rate of 0.4 mole/hour, and through another pipe, for the same time, with neutral ammonium sulfate in aqueous solution at a flow rate of 0.1 mole/hour. There is observed, at the reactor outlet, the evolution of 0.2 mole/hour of ammonia and of 0.1 mole/hour of hydrogen sulfide, as well as traces of sulfurous anhydride. The sulfur amount contained in the reactor has increased by about 12.8 g.

EXAMPLE 2

Two tests of ammonium sulfate reduction has been conducted under the following conditions:

Test A: In a reactor, comprising an ascending cooler, containing 250 g. of sulfur at a temperature of 380° C., there have been placed three corrosion test samples respectively of carbon steel (A), stainless steel (B) with 18% of Cr, 12% of Ni and 2% of Mo and stainless steel (C) with 20% of Cr, 25% of Ni, 4.5% of Mo and 1.5% of copper.

Hydrogen sulfide is introduced for 8 hours into the reactor at a flow rate of 0.033 mole/hour and, through another pipe, an aqueous solution of neutral ammonium sulfate is simultaneously introduced at a flow rate of 0.1 mole/hour. At the outlet of the reactor, there is observed the evolution of 0.2 mole/hour of ammonia and 0.133 mole/hour of sulfurous anhydride, together with $H_2S$ traces.

The corrosion rates of the test samples are respectively the following:

|  | Mm./year |
|---|---|
| Carbon steel (A) | 10 |
| Stainless steel (B) | 0.31 |
| Stainless steel (C) | 0.01 |

Test B: In the same reactor, also brought to a temperature of 380° C., but containing 250 g. of a mixture of ammonium acid sulfate and neutral sulfate, there are placed corrosion test samples identical to those of the preceding examples.

In the reactor, hydrogen sulfide is introduced for 8 hours at a flow rate of 0.033 mole/hour and through another pipe, over the same period, neutral ammonium sulfate in aqueous solution is supplied to the reactor at a flow rate of 0.1 mole/hour. At the reactor outlet, there is observed the evolution of 0.2 mole/hour of ammonia and of 0.133 mole/hour of sulfurous anhydride together with traces of hydrogen sulfide.

The corrosion rates of the test samples are respectively the following:

Carbon steel (A) ____ Test sample completely destroyed.
Stainless steel (B) ___ 73 mm./year.
Stainless steel (C) ___ 43 mm./year.

It is observed that the corrosion is much greater when the reduction of the ammonium sulfate is carried out in a medium of molten ammonium sulfate than when said reduction is conducted in a medium consisting essentially of sulfur.

EXAMPLE 3

Hydrogen sulfide at a flow rate of 0.4 mole/hour and ammonium acid sulfate at a flow rate of 0.1 mole/hour are introduced into a reactor containing 100 g. of sulfur brought to 350° C. There is observed, at the outlet of the reactor, the evolution of 0.1 mole/hour of ammonia and of 0.1 mole/hour of hydrogen sulfide together with traces of sulfurous anhydride. The sulfur amount contained in the reactor increased by about 12.8 g.

EXAMPLE 4

An aqueous solution containing per liter:

0.5 mole of $(NH_4)_2SO_4$
2 moles of $(NH_4)_2SO_3$
0.5 mole of $(NH_4)_2S_2O_3$ is introduced into a reactor, conveniently stirred, containing 50 kg. of sulfur brought to a temperature of 287° C. The feed rate of the aqueous solution to the reactor is 10 liters/hour.

There is injected into a reactor, at a flow rate of 10 Nm.³/hour, a gaseous flow issuing from a waste residual water stripper, having the following composition by volume:

|  | Percent |
|---|---|
| $H_2S$ | 13.3 |
| $NH_3$ | 20 |
| $H_2O$ | 66.7 |

There are thus recovered about 3 kg. of sulfur per hour and the gaseous effluent escaping from the stack contains about 20% of $NH_3$ and 80% of $H_2O$ by volume.

EXAMPLE 5

Into a reactor containing 100 g. of sulfur, brought to a temperature of 370° C., are introduced hydrogen sulfide at a flow rate of 0.6 mole/hour and ammonium tetrathionate in aqueous solution at a flow rate of 0.1 mole/hour. There is observed, at the outlet of the reactor, the evolution of 0.2 mole/hour of ammonia and of 0.1 mole/hour of hydrogen sulfide. The sulfur amount in the reactor increased by 28.8 g. per hour.

EXAMPLE 6

Into a reactor containing 100 g. of sulfur at 370° C., there are introduced 0.4 mole/hour of hydrogen sulfide and 0.4 mole/hour of neutral ammonium sulfate in aqueous solution. There is thus observed the evolution, at the outlet of the reactor, of 0.4 mole/hour of sulfurous anhydride and of 0.8 mole/hour of ammonia. The sulfur amount in the reactor increased by about 12.8 g.

What we claim is:

1. A process for manufacturing a member selected from the group consisting of sulfur dioxide, sulfur and mixtures thereof from an ammonium salt of a sulfur oxygenated acid, selected from the group consisting of sulfurous, sulfuric, thiosulfuric and polythionic acids comprising contacting said ammonim salt with a sulfide selected from the group consisting of hydrogen sulfide, ammonium sulfide and mixtures thereof, within liquid sulfur, in which from 0.2 to 10 moles of the sulfide is used per mole of ammonium salt.

2. A process according to claim 1, wherein the ammonium salt is ammonium sulfate.

3. A process according to claim 2, carried out at a temperature from 250° C. to 440° C.

4. A process according to claim 3, carried out at a temperature from 300 to 350° C.

5. A process according to claim 2, wherein the respective amounts of ammonium sulfate and sulfide which are contacted are in a molar ratio close to 1/3, so as to manufacture preferentially sulfur.

6. A process according to claim 2, wherein the respective amounts of ammonium sulfate and sulfide which are contacted, are in a molar ratio close to 3/1, so as to manufacture preferentially sulfur dioxide.

7. A process according to claim 1, carried out at a temperature of from 160 to 440° C.

8. A process according to claim 1, wherein the amounts of the ammonium salt of sulfur oxygenated acid and of sulfide which are contacted are such that:

$$\sum \begin{pmatrix} \text{sulfur oxidation number} \times \text{number of sulfur} \\ \text{atoms per mole of sulfur compound} \times \text{number of moles of sulfur compound} \end{pmatrix} = 0$$

9. A process according to claim 1, wherein the ammonium salt comprises both ammonium sulfate and ammonium sulfite.

References Cited

UNITED STATES PATENTS

| | | | |
|---|---|---|---|
| 3,325,248 | 6/1967 | Fournel | 423—539 |
| 3,383,170 | 5/1968 | Furkert et al. | 423—541 |
| 3,359,069 | 12/1967 | Furkert et al. | 423—540 |

OSCAR R. VERTIZ, Primary Examiner

G. P. STRAUB, Assistant Examiner

U.S. Cl. X.R.

423—242, 356, 541

UNITED STATES PATENT OFFICE
CERTIFICATE OF CORRECTION

PATENT NO. : 3,833,715
DATED : September 3, 1974
INVENTOR(S) : Andre Deschamps, Et Al It is certified that error appears in the above-identified patent and that said Letters Patent are hereby corrected as shown below:

Claim 1, line 5: after "and polythionic acids," add --and mixtures thereof--

Claim 1, line 6: change "contacting said ammonim" to --contacting said ammonium--.

Signed and Sealed this

Tenth Day of August 1976

[SEAL]

Attest:

RUTH C. MASON
Attesting Officer

C. MARSHALL DANN
Commissioner of Patents and Trademarks